(12) United States Patent
Heiling et al.

(10) Patent No.: US 9,608,558 B1
(45) Date of Patent: Mar. 28, 2017

(54) CALCULATION OF MOSFET SWITCH TEMPERATURE IN MOTOR CONTROL

(71) Applicant: Infineon Technologies AG, Neubiberg (DE)

(72) Inventors: Christian Heiling, Graz (AT); Matthias Bogus, Munich (DE)

(73) Assignee: Infineon Technologies AG, Neubiberg (DE)

( * ) Notice: Subject to any disclaimer, the term of this patent is extended or adjusted under 35 U.S.C. 154(b) by 2 days.

(21) Appl. No.: 14/853,627

(22) Filed: Sep. 14, 2015

(51) Int. Cl.
*H02H 5/04* (2006.01)
*H02P 29/00* (2016.01)
*G01K 7/00* (2006.01)

(52) U.S. Cl.
CPC ............ *H02P 29/0088* (2013.01); *G01K 7/00* (2013.01)

(58) Field of Classification Search
USPC .......... 318/471, 634, 641, 708, 791, 400.26, 318/400.27, 400.2; 324/750.06, 105
See application file for complete search history.

(56) References Cited

U.S. PATENT DOCUMENTS

| 8,847,575 B2* | 9/2014 | Koeppl | G01K 7/01 324/105 |
| 2010/0320951 A1* | 12/2010 | Hasegawa | H02P 29/0088 318/434 |
| 2012/0217795 A1* | 8/2012 | Hasegawa | B60L 3/003 307/9.1 |
| 2012/0250385 A1* | 10/2012 | Takihara | H02M 1/32 363/132 |
| 2013/0257329 A1* | 10/2013 | Orou | H02P 29/0088 318/400.26 |

FOREIGN PATENT DOCUMENTS

JP        2013251975 A  * 12/2013

OTHER PUBLICATIONS

"3-Phase Motor Drive Application Kit for Permanent Magnet Synchronous Motor and Induction Motor," Power Management & Drives Microcontrollers, Infineon, Application Brief, 2007, 2 pp. (Applicant points out that, in accordance with MPEP 609.04(a), the 2007 year of publication is sufficiently earlier than the effective U.S. filing date and any foreign priority date of Sep. 14, 2015 so that the particular month of publication is not in issue.)
Huang, "Hard Commutation of Power MOSFET, OptiMOS™ FD 200V/250V," Infineon, Application Note, V1.0, Mar. 12, 2014, 13 pp.

(Continued)

*Primary Examiner* — Jorge L Carrasquillo
(74) *Attorney, Agent, or Firm* — Shumaker & Sieffert, P.A.

(57) ABSTRACT

Systems and techniques are described for monitoring the operating temperature of one or more circuit elements, such as a metal oxide field effect transistor (MOSFET) switch, where the circuit element is used to control at least one phase of an electric motor. The systems and techniques may calculate temperature by determining at least two electrical signals from the circuit element taken at least two different times. This results in an accurate temperature calculation without requiring precise knowledge of the particular characteristics of each respective circuit element.

17 Claims, 5 Drawing Sheets

(56) References Cited

OTHER PUBLICATIONS

Kuhn, "Diode Characteristics," retrieved from http://www.kennethkuhn.com/students/ee351/diode_characteristics.pdf, Sep. 3, 2009, 13 pp.

Dodge, "Power MOSFET Tutorial," Advanced Power Technology, Application Note, APT-0403 Rev B, Mar. 2, 2006, 12 pp.

Storr, "The MOSFET—Metal Oxide FET," Basic Electronics Tutorials, retrieved from http://www.electronics-tutorials.ws/transistor/tran_6.html, Sep. 3, 2015, 13 pp.

\* cited by examiner

```
┌─────────────────────────────────────────────────────────────┐
│ AT A FIRST PREDETERMINED TIME, WHEN A MOSFET SWITCH IS OFF AND │
│ THE CURRENT IS FLOWING THROUGH THE INTRINSIC PARASITIC DIODE,  │─ 90
│ MEASURE THE DIODE FORWARD VOLTAGE ($U_{F1}$) AND CURRENT ($-I_1$) BY │
│ MEASURING THE MOSFET VOLTAGE ($V_{DS}$) AND MOSFET CURRENT ($I_{DS}$) │
└─────────────────────────────────────────────────────────────┘
                              │
                              ▼
┌─────────────────────────────────────────────────────────────┐
│ AT A SECOND PREDETERMINED TIME, WHEN THE MOSFET SWITCH IS OFF  │─ 92
│ AND THE CURRENT IS FLOWING THROUGH THE INTRINSIC PARASITIC     │
│ DIODE, MEASURE THE DIODE FORWARD VOLTAGE ($U_{F2}$) AND CURRENT ($-I_2$) │
│ BY MEASURING THE MOSFET VOLTAGE ($V_{DS}$) AND MOSFET CURRENT ($I_{DS}$) │
└─────────────────────────────────────────────────────────────┘
                              │
                              ▼
┌─────────────────────────────────────────────────────────────┐
│ CALCULATE THE OPERATING TEMPERATURE OF THE MOSFET SWITCH       │
│ (T) BY CALCULATING THE OPERATING TEMPERATURE OF THE            │
│ INTRINSIC PARASITIC DIODE ACCORDING TO EQUATION                │─ 94
│                                                                │
│          $T = (\Delta U_F * q)/(k * \ln(I_1/I_2))$             │
└─────────────────────────────────────────────────────────────┘
                              │
                              ▼
┌─────────────────────────────────────────────────────────────┐
│ CONTROL THE OPERATION OF THE MOSFET SWITCH BASED IN PART       │─ 96
│ ON THE CALCULATED OPERATING TEMPERATURE OF MOSFET SWITCH       │
└─────────────────────────────────────────────────────────────┘
                              │
                              ▼
┌─────────────────────────────────────────────────────────────┐
│              CONTROL THE OPERATION OF THE MOTOR                │─ 98
└─────────────────────────────────────────────────────────────┘
```

FIG. 5

CALCULATION OF MOSFET SWITCH TEMPERATURE IN MOTOR CONTROL

TECHNICAL FIELD

This disclosure relates to systems and techniques for calculating temperature in components used to control electric motors.

BACKGROUND

Smart circuits can be used for tasks like driving, supervising and protecting remote metal oxide field effect transistors (MOSFETs) from external faults and destruction from, for example, over-current, short-circuit or over-temperature. Accurately monitoring the temperature of the MOSFET can have significant advantages in operating range and cost savings.

SUMMARY

In general, this disclosure presents a system and technique to monitor the operating temperature of one or more metal oxide field effect transistor (MOSFET) switches where the MOSFET switch is used to control at least one phase of an electric motor. This system and technique calculates the temperature from at least two measurements taken at least two different times. This allows an accurate temperature calculation without requiring predetermined knowledge of the particular characteristics of each respective MOSFET.

In one example, this disclosure is directed to a system comprised of a metal oxide field effect transistor (MOSFET) switch configured to control at least one phase of an electric motor and a control unit configured to determine two or more electrical signals from the MOSFET switch at two or more different times, and calculate an operating temperature of the MOSFET based on the two or more electrical signals. In this system the "MOSFET switch" defines a transistor comprising a drain to source channel and a parasitic diode positioned in parallel with the channel.

In some examples, the motor control unit, at first predetermined time, determines a first drain-source voltage across the MOSFET switch, which is equal to a first forward voltage across the parasitic diode. At the same time the motor control unit determines a first current through the MOSFET switch equal to a first current through the parasitic diode. At a second predetermined time the motor control unit determines a second drain-source voltage across the MOSFET switch equal to a second forward voltage across the parasitic diode and a second current through the MOSFET switch equal to a second current through the parasitic diode. Both the first and second predetermined times may correspond to times when the MOSFET is in a "freewheeling state." That is, the MOSFET channel is OFF and the current is flowing in a reverse (negative) direction through the MOSFET by flowing in a forward direction through the parasitic diode.

The motor control unit may calculate the MOSFET operating temperature based on the values of the first and second forward voltages across the parasitic diode and the first and second current measurements through the parasitic diode. In this example the electrical signals through the MOSFET, and its parasitic diode, are time varying signals. The motor control unit uses an equation to calculate the temperature that depends only on some physics constants and the first and second forward voltage and current values. By using two measurements of the time-varying signals at differ times, device parameters can be eliminated from the calculation.

In some examples the motor control unit controls the electric motor operation by controlling each respective MOSFET switch operation, based in part on the calculated operating temperature of each respective MOSFET switch. One or more microprocessors can be configured to monitor and control the operation of the motor control unit. Also, a system power supply can be configured to deliver power to the motor control unit and thereby deliver power to the one or more MOSFET switches to further distribute power to the one or more phases of the motor. The motor control unit may comprise an integrated circuit (IC) that controls one or more MOSFETs external to the IC and the electric motor can comprise a multi-phase motor defining a plurality of operational phases.

In another example, this disclosure is directed to a method that comprises determining two or more electrical signals from a MOSFET switch at two or more different times, wherein the MOSFET switch is configured to control at least one phase of an electric motor, and wherein the MOSFET switch defines a transistor comprising a drain to source channel and a parasitic diode positioned in parallel with the channel. This method calculates an operating temperature of the MOSFET switch based at least in part on the two or more electrical signals.

In one example, determining the two or more electrical signals comprises at a first time, determining a first drain-source voltage across the MOSFET switch equal to a first forward voltage across the parasitic diode and a first current through the MOSFET switch equal to a first current through the parasitic diode. At a second time, determining a second drain-source voltage across the MOSFET switch equal to a second forward voltage across the parasitic diode and a second current through the MOSFET switch equal to a second current through the parasitic diode. In this example, the method calculates the temperature according to an equation that depends only on some physics constants and the first and second forward voltage and current values. In this example, the first current measurement is generally a greater magnitude than the second current measurement. The current may be negative during the first measurement, and although the value may be less, the magnitude may still be greater than that of the second measurement.

A method may further control the operation of one or more respective MOSFET switches and thereby controlling one or more phases of the electric motor operation based in part on the calculated operating temperature of each respective MOSFET switch. Controlling each respective MOSFET switch operation can comprise controlling the time the respective MOSFET switch is on and off.

Although the techniques of this disclosure are described with respect to a MOSFET, they may find application with other circuit elements that include an electrical channel and a parasitic diode in parallel with the electrical channel. Accordingly, in another example, a system may comprise a circuit element, wherein the circuit element defines a channel and a parasitic diode positioned in parallel with the channel, and a control unit configured to determine two or more electrical signals from the circuit element at two or more different times, and calculate an operating temperature of circuit element based on the two or more electrical signals. The circuit element may be a MOSFET in some examples, but in other examples, the circuit element may correspond to another type of circuit element that includes an electrical channel and a parasitic diode in parallel with the electrical channel.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS

FIG. 5 is a flowchart illustrating a method for accurately calculating the temperature of a MOSFET switch by measuring one or more electrical signals through the MOSFET.

DETAILED DESCRIPTION

This disclosure presents systems and techniques to monitor the operating temperature of one or more metal oxide field effect transistor (MOSFET) switches where the MOSFET switch is used to control at least one phase of an electric motor. The described systems and techniques may calculate the temperature from at least two measurements of electrical signals taken at least two different times. This allows an accurate temperature calculation without requiring precise knowledge of the particular characteristics of each respective MOSFET. Based in part on this temperature calculation, the system can then control the operation of the MOSFET switches, and thereby control the motor operation.

The techniques may also leverage the existence of a parasitic diode within the MOSFET. By doing so, the techniques may eliminate the need for a dedicated diode for the purpose of temperature measurement.

One example technique for measuring temperature, according to this disclosure, is to use a circuit element such as a P/N junction. For example, the P/N junction of a diode or the base-emitter (B-E) junction of a bipolar junction transistor (BJT). By determining a current (I) and forward voltage ($U_F$) of a time-varying signal through the P/N junction at a first time and a second current and forward voltage at a second, different time, it is possible to calculate an operating temperature of the P/N junction. This technique does not require precise, detailed knowledge of the particular characteristics of the circuit element, such as dimensions, level of doping, materials, or other device parameters. In other examples, however, the need for a dedicated circuit element may be eliminated by leveraging the existence of a parasitic element that is intrinsic to an element for which temperature measurement is desired. In particular, systems for measuring temperature may be improved and simplified by leveraging the existence of a parasitic diode, e.g., in a MOSFET, when performing temperature calculations on the MOSFET.

Figure 1:
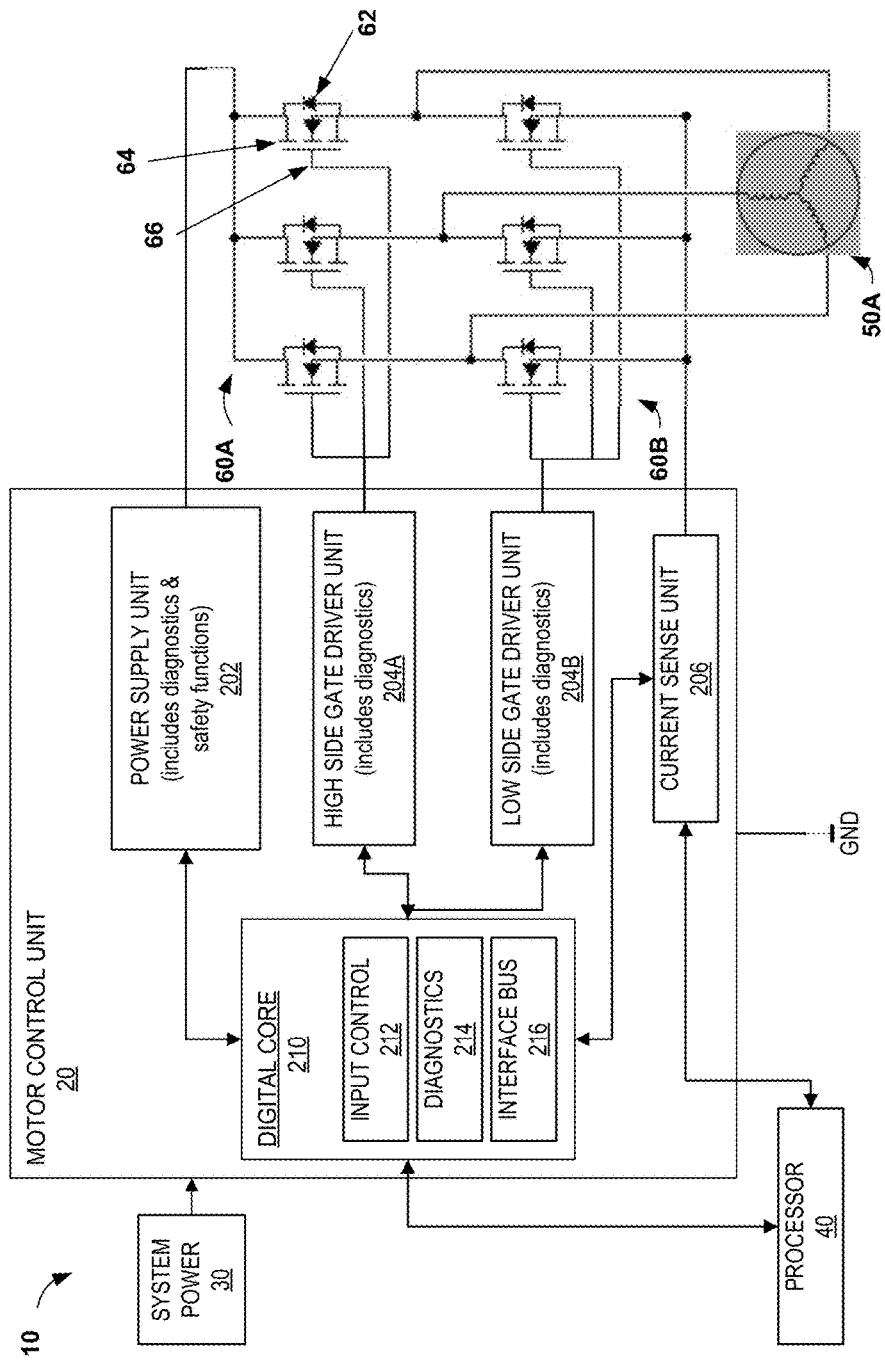
FIG. 1 is a block diagram illustrating a system to control an electric motor comprising motor control unit that controls one or more MOSFETs that control power to one or more phases of a motor.

MOSFETs are well suited to drive loads where monitoring temperature is important because every MOSFET has a body diode that is an intrinsic by-product of a MOSFET and formed by the PN junction in its physical construction (see FIG. 1, item 62). Monitoring the electrical signals, such as current through and forward voltage drop across the parasitic (body) diode makes it possible to calculate the temperature of the body diode. Because the body diode is an intrinsic part of the MOSFET, positioned in parallel to the drain-source channel of the MOSFET, the temperature of the body diode is the temperature of the MOSFET.

This diode is in parallel with the drain-source channel of the MOSFET. This diode can be referred to by several names including: reverse diode, anti-parallel diodes, freewheeling diode, body diode, flyback diode, snubber diode, suppressor diode and parasitic diode. Reverse drain current cannot be blocked because the body is shorted to the source, providing a high current path through the body diode. Reverse or negative current through the MOSFET is positive current through the body diode. This is also called freewheeling.

The technique in this disclosure takes at least two measurements of a time varying current flowing in a forward direction through the P/N junction of a MOSFET parasitic diode. At the same time as each respective current measurement, take the forward voltage drop ($U_F$) across the P/N junction. Because the current varies with time, there will be at least one current measurement (e.g. $I_1$), that is at a lower level than at least one other current measurement ($I_2$). For each current measurement there will be a respective forward voltage drop ($U_{F1}$ and $U_{F2}$). These measurements are related to temperature according to the below equation, which can be solved for temperature (T). Using the below technique of taking two measurements of a time varying current requires no precise knowledge of the particular P/N junction (e.g. doping level, dimensions, or other device parameters).

The techniques of this disclosure may utilize the following equation:

$$\Delta U_F = \frac{k*T}{q} * \ln\left(\frac{I_1}{I_2}\right) \rightarrow T = \frac{\Delta U_F * q}{k * \ln\left(\frac{I_1}{I_2}\right)} \quad \text{(Equation 1)}$$

where:
k is Boltzmann's constant, 1.38E-23 Joules/Kelvin, and
q is the magnitude of an electron charge, 1.609E-19 coulombs.

There are other techniques that could be used to monitor the operating temperature of a MOSFET switch. Many such techniques, however, may require detailed knowledge of each particular MOSFET, such as the construction, level of doping in the drain-source channel, or other parameters. One equation for current through a P/N junction, such as a diode, is:

$$I = I_S * (\exp(V/(n*k*T/q)) - 1) \quad \text{(Equation 2)}$$

where:
I is the current through the diode,
V is the voltage across the diode (which can be positive or negative),
k is Boltzmann's constant, 1.38E-23 Joules/Kelvin,
T is temperature in Kelvin,
q is the magnitude of an electron charge, 1.609E-19 coulombs,
n is a junction constant (typically around 2 for diodes, 1 for transistors), and
$I_S$ is the reverse saturation current This equation requires precise knowledge of the P/N junction characteristics ($I_S$ and n).

In a first example, techniques may be used to monitor a single forward voltage drop ($V_{DS}$) of the parasitic diode (body diode) of the MOSFET during freewheeling. This method also requires precise knowledge of technology and device parameters of the MOSFETs and the corresponding parameter corrections would need to be done, such as in a microcontroller. To get this precise knowledge often requires extensive empirical testing to correlate the measured electrical signals to the calculated temperature. Even after extensive testing, however, normal MOSFET manufacturing variation limits the accuracy of the calculated temperature. Normal manufacturing variation can occur lot to lot within a given supplier. There can also be differences between different suppliers, even for MOSFETs with the same specifications. These differences can lead to a less accurate temperature measurement.

In a second example, techniques may be used to monitor a single $V_{DS}$ voltage drop and a single the $I_{DS}$ current at a single point in time and calculating the actual MOSFET $R_{DSon}$, which is temperature related. This technique assumes the current will stay constant during the measurement. This technique may also require precise knowledge of the technology and device parameters of the MOSFETs and, as above, the corresponding parameter corrections would need to be done, by some part of the system, such as in a microcontroller. This example also has the same issues with normal manufacturing variation and less accurate temperature measurement, as described above. The first and second examples could also be used for applications using direct current (DC) or other power sources that do not vary with time.

In a third example, techniques for monitoring temperature may use an additional external temperature sensing device (e.g. an NTC resistor or a P/N junction device such as a diode) for sensing the temperature. This method is relatively cost intensive and still inaccurate and slow because of the difficulties to mount the sensing device in an appropriate place sufficiently close to the MOSFET so that they are thermally well coupled. When monitoring temperature in an insulated gate bipolar transistor (IGBT), an external temperature sensing device may be needed. In contrast, however, a MOSFET typically includes a parasitic diode that is intrinsically part of the MOSFET. By leveraging the existence of a parasitic diode for use in temperature measurements, advantages can be realized relative to techniques that use external sensors, because with external sensors, the proximity of the sensing device to the temperature being measured can lead to less accurate temperature measurement.

For example, the use of dedicated temperature sensors can result in temperature accuracies that vary +/−30° C. or more. This means that systems using dedicated sensors for detecting temperature in MOSFETs may require the MOSFET to operate at very conservative temperatures, well below the maximum temperature, in order to account for variance in the measurements. As an example, an electric motor drive system with less accurate temperature monitoring may need to operate at less than 125° C. to ensure reliable performance. A system comparable system with accuracies to +/−5° C., however, can operate within an increased temperature range, for example up to 140° C., because of the greater certainty of the actual system operating temperature.

Also with a less accurate temperature measurement, designers cannot be certain of the actual temperature of the system. The system components (housing, circuit boards, or other components) may require over-design to deliver acceptable reliability. The system components may need to withstand higher temperatures to account for measurement variance. This can drive up manufacturing costs with little or no performance improvement. For example, instead of using an FR4 material for a printed circuit board (PCB), the system may require more expensive ceramic PCBs. The system housing may need to be built from machined or stamped metal instead of a less expensive molded plastic. The ability to reliably and accurately measure temperature can therefore provide significant cost savings to manufacturers and their customers.

As described above, one or more of the techniques described in this disclosure may depend only on basic physics, not on detailed knowledge of a particular MOSFET component. These techniques can yield reliable calculated temperatures from component to component and system to system with accuracies to +/−5° C.

FIG. 1 is a conceptual and schematic block diagram illustrating an example system 10 that may calculate the operating temperature of one or more MOSFET switches 60A, 60B in accordance with one or more techniques of this disclosure. In this example, the MOSFET switches are configured as high side MOSFET switches 60A and low side MOSFET switches 60B, each of which is configured to control at least one phase of motor 50A. FIG. 1 is merely an example, and the temperature measurement techniques of this disclosure may be used with MOSFETs in other types of circuits.

Each MOSFET switch in FIG. 1 may comprise a drain-source channel 64 and a parasitic diode 62 positioned in parallel to the drain-source channel. This parasitic diode 62 is an intrinsic by-product of a MOSFET as formed by its physical construction, as described above. The parasitic diode 62 can also be called by other names including: reverse diode, anti-parallel diodes, freewheeling diode and body diode.

The parasitic diode 62 may be considered to be anti-parallel to the drain-source channel because when the MOSFET is reverse-biased, the diode 62 is forward biased. Another way to describe this is when the MOSFET channel 64 is OFF and the current is flowing in a reverse (negative) direction through the MOSFET, the current flows in a forward direction through the parasitic diode. This example system 10 shows an N-channel, enhancement-type MOSFET, meaning for the MOSFETs 60A and 60B to be OFF the MOSFET gate 66 would be zero or negative. Other types of transistors can be used as components of a motor drive system.

The motor control unit (MCU) 20 in this example is configured to determine the operating temperature of one or more MOSFETs by determining two or more electrical signals from the MOSFET switch at two or more different times. In one example, the MCU 20 determines a first and second voltage ($V_{DS}$) at a first and second time across a selected MOSFET switch using the diagnostic functions in the power supply unit 202. At the same times that MCU 20 determines the first and second voltage, MCU 20 also determines a first and second current ($I_{DS}$) flowing through the selected MOSFET, for example, by using the current sense unit 206. As described above, voltage across a selected MOSFET ($V_{DS}$) is the same as the voltage across the parasitic diode 62 for that MOSFET.

When the MOSFET is freewheeling (e.g. negative current through the MOSFET), the diode 62 will be forward biased. The voltage across the MOSFET will be the forward voltage of the parasitic diode 62. Similarly, when freewheeling, the current through the selected MOSFET will be the same as the forward current through the diode 62 for that MOSFET.

Details of one example of measuring the current and voltage will be discussed below referring to FIG. 2. Additional details of the signals will be discussed below referring to FIG. 3.

The MCU 20 uses these two voltages and two currents determined at two different times to calculate the temperature of the parasitic diode 62. In one example, MCU 20 may use the components of the digital core 210 to perform this calculation. MCU 20 may be configured to calculate the temperature with other components. The digital core 210 may contain sub-units such as an input control 212, diagnostics 214 and an interface bus 216. Of course MCU 20 is merely exemplary, and other types of control units may also be used according to this disclosure.

As discussed above, calculating the temperature of the diode 62 gives a substantially accurate estimate of the operating temperature of the MOSFET of which the diode 62 is an intrinsic part. The MCU 20 may control motor 50A by controlling the MOSFET operation based in part on the calculated operating temperature of each respective MOSFET switch. In one example, MCU 20 may control each respective MOSFET switch operation by controlling the time the respective MOSFET switch is on and off.

System 10 may comprise other components such as one or more processors 40 configured to monitor and control the operation of the motor control unit. Examples of one or more processors 40 may include, any one or more of a microprocessor, a microcontroller, a digital signal processor (DSP), an application specific integrated circuit (ASIC), a field-programmable gate array (FPGA), or equivalent discrete or integrated logic circuitry.

System 10 may also include a system power supply 30 configured to deliver power to the motor control unit and thereby deliver power to the one or more MOSFET switches to further distribute power to the one or more phases of the motor. While techniques of this disclosure generally refer to system 10, MOSFETs 60A, 60B and motor 50A, the techniques described herein may be performed in any application that controls an electric motor.

Figure 2:
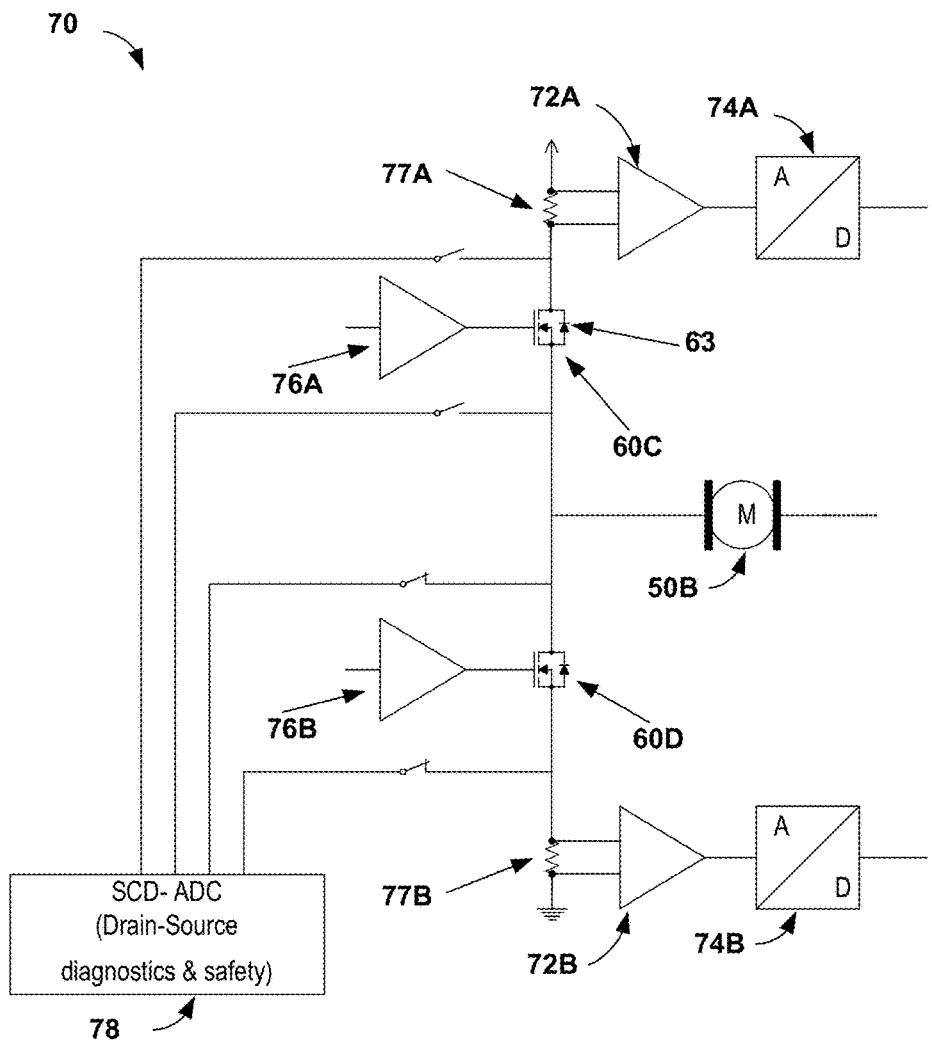
FIG. 2 is a diagram illustrating a detailed of a MOSFET control and measurement circuit.

FIG. 2 is a schematic and block diagram that shows one example of a detailed view 70 of the MOSFETs and associated control and measurement components described by FIG. 1. In this example, gate drivers 76A and 76B control the MOSFETs 60C and 60D as directed by motor control unit 20 and thereby control motor 50B. Resistor 77A and differential amplifier 72A measure the current through MOSFET 60C and communicate with motor control unit 20 through the Analog to Digital Converter (ADC) 74A. Resistor 77B, differential amplifier 72B and ADC 74B perform the same current measurement function for MOSFET 60D. As one example, the current sense unit 206 could include resistors 77A and 77B, differential amplifiers 72A and 72B and ADCs 74A and 74B. Other components (not shown) could measure the voltage ($V_{DS}$) across each MOSFET 60C, 60D and communicate with MCU 20.

Figure 3:
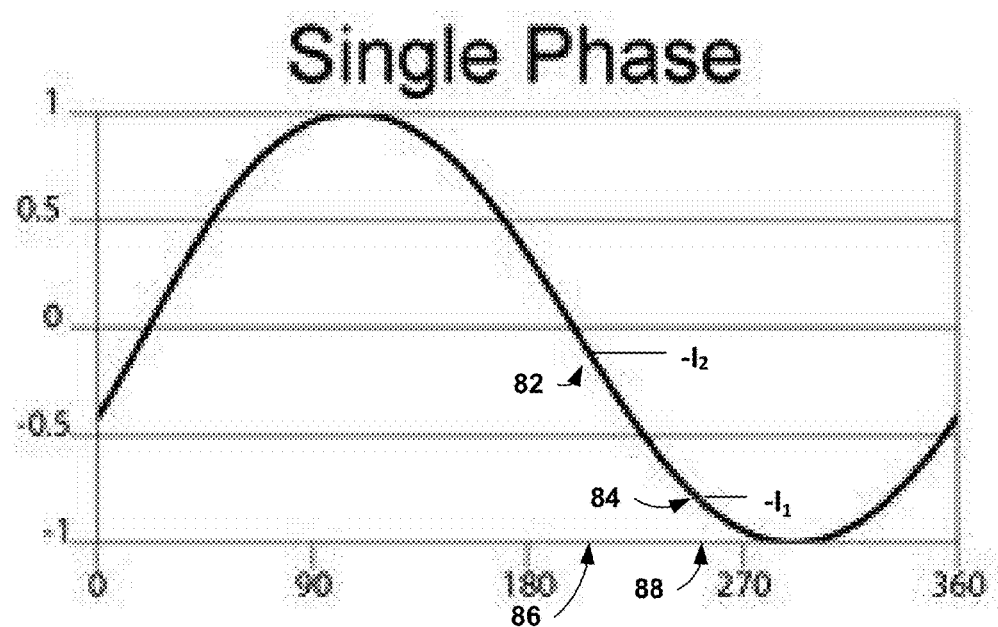
FIG. 3 is a diagram illustrating a time varying signal and points on that signal that can be measured at different times.

FIG. 3 shows an example of a single phase, time varying signal. Although FIG. 3 depicts a sine function, the techniques and systems in this disclosure may also function with other time varying signals such as a triangle function. In the example of FIG. 3, at a first predetermined time 88, MCU 20 determines a first current through the MOSFET switch equal to a first current 84 ($-I_1$) through a parasitic diode, such as that depicted by diode 62 in FIG. 1. At the same first time, MCU 20 determines a first drain-source voltage ($V_{DS}$) across the MOSFET switch equal to a first forward voltage ($U_{F1}$) (not shown). At a second predetermined time 86, MCU 20 determines a second current through the MOSFET switch equal to a second current 82 ($-I_2$) through the same parasitic diode. At the same second time, MCU 20 determines a second drain-source voltage across the MOSFET switch equal to a second forward voltage ($U_{F2}$) (not shown). MCU 20 of system 10 can calculate the operating temperature of the parasitic diode according to Equation 1, described above, without precise knowledge of the particular characteristics of the MOSFET switch and its associated parasitic diode. Because the parasitic diode is intrinsically part of the MOSFET, calculating the operating temperature of the diode will yield the operating temperature of the MOSFET.

Figure 4A:
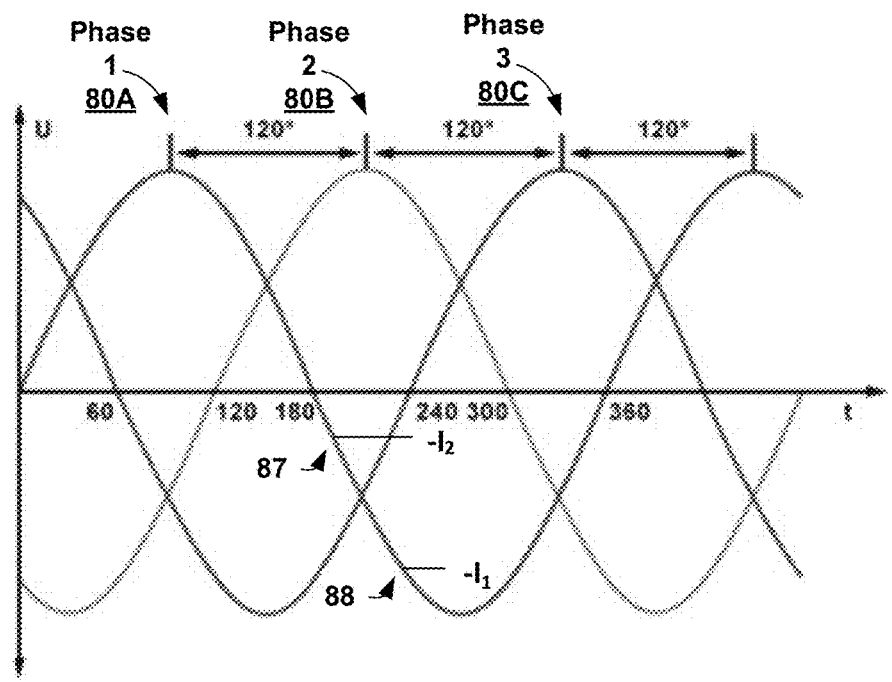
FIGS. 4A and 4B are diagrams illustrating a multi-phase signal and multi-phase load, respectively.
Figure 4B:
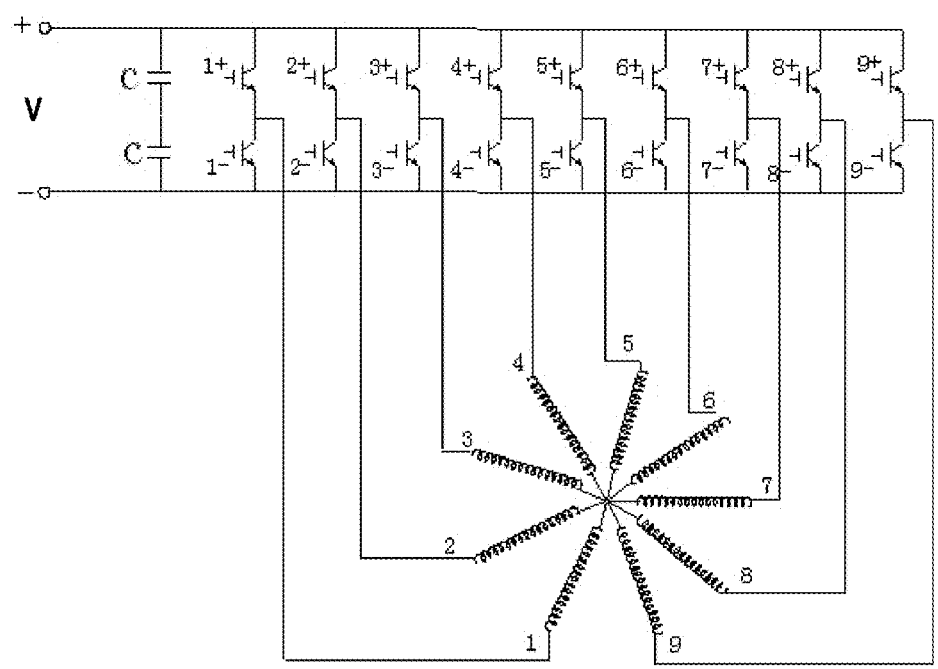

FIG. 4A depicts an example of a multi-phase signal with three phases, 80A, 80B and 80C. The techniques described above to calculate operating temperature for a single phase can be used with a multi-phase motor by determining the current and forward voltage of the parasitic diode associated with a selected MOSFET. This is determined at two predetermined times as depicted by FIG. 4A 88 ($-I_1$) and 87 ($-I_2$). Note that in both FIG. 4A and FIG. 3 that system 10 determines the forward diode voltages ($U_{1F}$, $U_{2F}$) and currents ($-I_1$, $-I_2$) during the negative portion of the signal, when the signal has passed through zero. This is the predetermined time when the MOSFET is OFF and the parasitic diode is freewheeling. FIG. 4A depicts determining the current, and voltages, for phase one 80A. The same techniques can be used on any phase such as phase two 80B and phase three 80C. FIG. 4B depicts another example of a multi-phase load. Other examples, such as a four-phase motor, two-phase motor and the like could be used.

FIG. 5 is a flow chart illustrating an example calculation of MOSFET operating temperature, in accordance with the techniques of this disclosure. The explanation below considers system 10 and detailed view 70 from FIGS. 1 and 2, as well as the single phase signal from FIG. 3. The explanation describes the calculation as it applies to a single MOSFET switch 60C, but can apply to any of the plurality of MOSFET switches in a system.

At a first predetermined time, when a MOSFET switch 60C is off and the current is flowing through the intrinsic parasitic diode, MCU 20 measures the diode 63 forward voltage ($U_{F1}$) and current ($-I_1$) by measuring the MOSFET voltage ($V_{DS}$) and MOSFET current ($I_{DS}$) (90). For example, MCU 20 may determine that a first time, a selected MOSFET switch 60C is OFF and the current is flowing in a negative direction (e.g. 84 in FIG. 3). Current sense unit 206 can determine the first current ($I_{DS}$) at this time using resistor 77A, differential amplifier 72A and ADC 74A. With the MOSFET switch 60C OFF, the current ($I_{DS}$) is flowing through the intrinsic parasitic diode 63 for MOSFET switch 60C because diode 63 is positioned parallel to the drain-source channel of MOSFET 60C. Therefore $I_{DS}$ for MOSFET 60C at this first time is the same as $-I_1$ (84). At this same first time, the power supply unit 202 can determine the MOSFET voltage ($V_{DS}$), which is the same as diode 63 forward voltage ($U_{F1}$).

Then, at a second predetermined time, when the MOSFET switch is off and the current is flowing through the intrinsic parasitic diode, MCU 20 measures the diode forward voltage ($U_{F2}$) and current ($-I_2$) by measuring the MOSFET voltage ($V_{DS}$) and MOSFET current ($I_{DS}$) (92). In this example, MCU 20 can repeat the measurement process at a second time (92) and determine a second current ($-I_2$) and second forward voltage ($U_{F2}$). As shown in FIG. 3, the first voltage 84 ($-I_1$) is a greater magnitude (more negative) than the second voltage 82 ($-I_2$).

MCU 20 may then calculate the operating temperature of the MOSFET switch (T) by calculating the operating temperature of the intrinsic parasitic diode 63 according to equation:

$$T = \frac{\Delta U_F * q}{k * \ln\left(\frac{I_1}{I_2}\right)},$$

(94) as detailed above. As noted above, determining two signals at two different times enables MCU 20 to calculate the operating temperature (T) with no need for precise knowledge of the particular characteristics of MOSFET switch 60C. Also, as noted above, because parasitic diode 63 is intrinsic to MOSFET 60C, calculating the operating temperature of diode 63 gives an accurate estimate of the temperature of MOSFET 60C in and the drain-source channel of MOSFET 60C in particular.

MCU 20 may then control the operation of the MOSFET switch 60C based in part on the calculated temperature of the MOSFET switch (96) as well as control the operation of the motor 50B (98). Other factors that could affect the operation of the MOSFETs and thereby affect motor 50A, 50B operation could include commands from, for example, processor 40. MCU 20 may use the diagnostic and safety features, such as those in power supply unit 202, and digital core 210 to control the MOSFET switches by controlling the timing of gate drivers 76A and 76B. In one example, should MOSFET switch 60C approach a high temperature, the diagnostic and safety features of MCU 20 can reduce the on-time by activating gate switch 76A for a shorter period. This increases the time MOSFET switch 60C is off and can help control its temperature. In this way system 10 can operate over a wider temperature range than a system with a less accurate temperature measurement scheme.

Although the techniques of this disclosure are described with respect to a MOSFET, they may find application with other circuit elements that include an electrical channel and a parasitic diode in parallel with the electrical channel. Accordingly, in another example, a system may comprise a circuit element, wherein the circuit element defines a channel and a parasitic diode positioned in parallel with the channel, and a control unit configured to determine two or more electrical signals from the circuit element at two or more different times, and calculate an operating temperature of circuit element based on the two or more electrical signals. The circuit element may be a MOSFET in some examples, but in other examples, the circuit element may correspond to another type of circuit element that includes an electrical channel and a parasitic diode in parallel with the electrical channel.

Accordingly, in a broader sense, this disclosure describes a system comprising a circuit element, wherein the circuit element defines a channel and a parasitic diode positioned in parallel with the channel, and a control unit configured to determine two or more electrical signals from the circuit element at two or more different times, and calculate an operating temperature of circuit element based on the two or more electrical signals. In some examples, the circuit element is a MOSFET switch defined as a transistor comprising a drain to source channel and a parasitic diode positioned in parallel with the channel, however, this disclosure is not necessarily limited to examples that use a MOSFET.

The following examples may illustrate one or more aspects of the disclosure.

Example 1

A system comprising: a metal oxide field effect transistor (MOSFET) switch configured to control at least one phase of an electric motor, wherein the MOSFET switch defines a transistor comprising a drain to source channel and a parasitic diode positioned in parallel with the channel; and a control unit configured to determine two or more electrical signals from the MOSFET switch at two or more different times, and calculate an operating temperature of the MOSFET based on the two or more electrical signals.

Example 2

The system of example 1, wherein the motor control unit: determines a first drain-source voltage across the MOSFET switch equal to a first forward voltage across the parasitic diode and a first current through the MOSFET switch equal to a first current through the parasitic diode at first predetermined time; determines a second drain-source voltage across the MOSFET switch equal to a second forward voltage across the parasitic diode and a second current through the MOSFET switch equal to a second current through the parasitic diode at second predetermined time; and calculates the MOSFET operating temperature based on the values of the first and second forward voltages across the parasitic diode and the first and second current measurements through the parasitic diode.

Example 3

The system of any of examples 1-2, wherein the two or more electrical signals through the MOSFET switch are time varying signals.

Example 4

The system of any of examples 1-3, wherein the control unit is configured to calculate the temperature (T) according to an equation:

$$T = \frac{\Delta U_F * q}{k * \ln\left(\frac{I_1}{I_2}\right)}$$

wherein:
q is the magnitude of an electron charge, 1.609E-19 coulombs,
k is Boltzmann's constant, 1.38E-23 Joules/° Kelvin,
$\Delta U_F$ is a difference between the first forward voltage and the second forward voltage of the parasitic diode, and
$\ln(I_1/I_2)$ is the natural logarithm of a quotient of the first current and the second current of the MOSFET switch.

Example 5

The system of any of examples 1-4, wherein the control unit comprises a power supply unit, a current sense unit and a digital core.

Example 6

The system of any of examples 1-5, further comprising the control unit configured to control each respective MOS- FET switch operation and thereby control the electric motor operation based in part on the calculated operating temperature of each respective MOSFET switch.

Example 7

The system of any of examples 1-6 wherein control unit is configured to control each respective MOSFET switch operation by controlling the time the respective MOSFET switch is on and off.

Example 8

The system of any of examples 1-7, further comprising: one or more processors configured to monitor and control the operation of the motor control unit; and a system power supply configured to deliver power to the motor control unit and thereby deliver power to the one or more MOSFET switches to further distribute power to the one or more phases of the motor.

Example 9

The system of any of examples 1-8, wherein the electric motor comprises a multi-phase motor defining a plurality of operational phases.

Example 10

The system of claim 1, wherein the motor control unit comprises an integrated circuit (IC) that controls one or more MOSFETs external to the IC.

Example 11

A method comprising: determining two or more electrical signals from a metal oxide field effect transistor (MOSFET) switch at two or more different times, wherein the MOSFET switch is configured to control at least one phase of an electric motor, and wherein the MOSFET switch defines a transistor comprising a drain to source channel and a parasitic diode positioned in parallel with the channel; and calculating an operating temperature of the MOSFET switch based at least in part on the two or more electrical signals.

Example 12

The method of example 11, wherein determining the two or more electrical signals comprises: at a first time, determining a first drain-source voltage across the MOSFET switch equal to a first forward voltage across the parasitic diode and a first current through the MOSFET switch equal to a first current through the parasitic diode; and at a second time, determining a second drain-source voltage across the MOSFET switch equal to a second forward voltage across the parasitic diode and a second current through the MOSFET switch equal to a second current through the parasitic diode.

Example 13

The method of any of examples 11-12, wherein calculating the operating temperature comprises calculating the temperature (T) according to an equation $$T = \frac{\Delta U_F * q}{k * \ln\left(\frac{I_1}{I_2}\right)}$$

wherein:
q is the magnitude of an electron charge, 1.609E-19 coulombs,
k is Boltzmann's constant, 1.38E-23 Joules/Kelvin,
$\Delta U_F$ is a difference between the first forward voltage and the second forward voltage of the parasitic diode, and
$\ln(I_1/I_2)$ is the natural logarithm of a quotient of the first current and the second current of the MOSFET switch.

Example 14

The method of any of examples 11-13, wherein the first current measurement is a greater magnitude than the second current measurement.

Example 15

The method of any of examples 11-14, further comprising controlling the operation of one or more respective MOSFET switches and thereby controlling one or more phases of the electric motor operation based in part on the calculated operating temperature of each respective MOSFET switch.

Example 16

The method of any of examples 11-15, wherein controlling each respective MOSFET switch operation comprises controlling the time the respective MOSFET switch is on and off.

Example 17

A system comprising: a circuit element, wherein the circuit element defines a channel and a parasitic diode positioned in parallel with the channel; and a control unit configured to determine two or more electrical signals from the circuit element at two or more different times, and calculate an operating temperature of circuit element based on the two or more electrical signals.

Example 18

The system of example 17, wherein the circuit element is a MOSFET switch defined as a transistor comprising a drain to source channel and a parasitic diode positioned in parallel with the channel.

Example 19

The system of any of examples 17-18, wherein the control unit: determines a first drain-source voltage across the MOSFET switch equal to a first forward voltage across the parasitic diode and a first current through the MOSFET switch equal to a first current through the parasitic diode at first predetermined time; determines a second drain-source voltage across the MOSFET switch equal to a second forward voltage across the parasitic diode and a second current through the MOSFET switch equal to a second current through the parasitic diode at second predetermined time; and calculates the MOSFET operating temperature based on the values of the first and second forward voltages across the parasitic diode and the first and second current measurements through the parasitic diode.

Example 20

The system of any of examples 17-19, wherein the control unit is further configured to control each respective MOSFET switch operation and thereby control an electric motor operation based in part on calculated operating temperatures of each respective MOSFET switch.

Various embodiments and examples have been described. These and other embodiments and examples are within the scope of the following claims.

The invention claimed is:

1. A system comprising:
a metal oxide field effect transistor (MOSFET) switch configured to control at least one phase of an electric motor, wherein the MOSFET switch defines a transistor comprising a drain to source channel and a parasitic diode positioned in parallel with the channel; and
a control unit configured to determine two or more electrical signals from the MOSFET switch at two or more different times, and calculate an operating temperature of the MOSFET based on the two or more electrical signals,
wherein the control unit:
determines a first drain-source voltage across the MOSFET switch equal to a first forward voltage across the parasitic diode and a first current through the MOSFET switch equal to a first current through the parasitic diode at first predetermined time;
determines a second drain-source voltage across the MOSFET switch equal to a second forward voltage across the parasitic diode and a second current through the MOSFET switch equal to a second current through the parasitic diode at second predetermined time; and
calculates the MOSFET operating temperature based on the values of the first and second forward voltages across the parasitic diode and the first and second current measurements through the parasitic diode.

2. The system of claim 1 wherein the two or more electrical signals through the MOSFET switch are time varying signals.

3. The system of claim 1 wherein the control unit is configured to calculate the temperature (T) according to an equation:

$$T = \frac{\Delta U_F * q}{k * \ln\left(\frac{I_1}{I_2}\right)}$$

wherein:
q is the magnitude of an electron charge, 1.609E-19 coulombs,
k is Boltzmann's constant, 1.38E-23 Joules/° Kelvin,
$\Delta U_F$ is a difference between the first forward voltage and the second forward voltage of the parasitic diode, and
$\ln(I_1/I_2)$ is the natural logarithm of a quotient of the first current and the second current of the MOSFET switch.

4. The system of claim 1, wherein the control unit comprises a power supply unit, a current sense unit and a digital core.

5. The system of claim 1, further comprising the control unit configured to control each respective MOSFET switch operation and thereby control the electric motor operation based in part on the calculated operating temperature of each respective MOSFET switch.

6. The system of claim 5 wherein control unit is configured to control each respective MOSFET switch operation by controlling the time the respective MOSFET switch is on and off.

7. The system of claim 1, further comprising:
one or more processors configured to monitor and control the operation of the motor control unit; and
a system power supply configured to deliver power to the motor control unit and thereby deliver power to the one or more MOSFET switches to further distribute power to the one or more phases of the motor.

8. The system of claim 1, wherein the electric motor comprises a multi-phase motor defining a plurality of operational phases.

9. The system of claim 1, wherein the motor control unit comprises an integrated circuit (IC) that controls one or more MOSFETs external to the IC.

10. A method comprising:
determining two or more electrical signals from a metal oxide field effect transistor (MOSFET) switch at two or more different times, wherein the MOSFET switch is configured to control at least one phase of an electric motor, and wherein the MOSFET switch defines a transistor comprising a drain to source channel and a parasitic diode positioned in parallel with the channel; and
calculating an operating temperature of the MOSFET switch based at least in part on the two or more electrical signals,
wherein determining the two or more electrical signals comprises:
at a first time, determining a first drain-source voltage across the MOSFET switch equal to a first forward voltage across the parasitic diode and a first current through the MOSFET switch equal to a first current through the parasitic diode, and
at a second time, determining a second drain-source voltage across the MOSFET switch equal to a second forward voltage across the parasitic diode and a second current through the MOSFET switch equal to a second current through the parasitic diode,
wherein calculating the operating temperature of the MOSFET comprises:
calculating the MOSFET operating temperature based on the values of the first and second forward voltages across the parasitic diode and the first and second current measurements through the parasitic diode.

11. The method of claim 10 wherein calculating the operating temperature comprises calculating the temperature (T) according to an equation $$T = \frac{\Delta U_F * q}{k * \ln\left(\frac{I_1}{I_2}\right)}$$

wherein:
q is the magnitude of an electron charge, 1.609E-19 coulombs,
k is Boltzmann's constant, 1.38E-23 Joules/Kelvin,
$\Delta U_F$ is a difference between the first forward voltage and the second forward voltage of the parasitic diode, and $\ln(I_1/I_2)$ is the natural logarithm of a quotient of the first current and the second current of the MOSFET switch.

12. The method of claim 10, wherein the first current measurement is a greater magnitude than the second current measurement.

13. The method of claim 10, further comprising controlling the operation of one or more respective MOSFET switches and thereby controlling one or more phases of the electric motor operation based in part on the calculated operating temperature of each respective MOSFET switch.

14. The method of claim 13, wherein controlling each respective MOSFET switch operation comprises controlling the time the respective MOSFET switch is on and off.

15. A system comprising:
   a switch, wherein the switch defines a channel and a parasitic diode positioned in parallel with the channel; and
   a control unit configured to determine two or more electrical signals from the switch at two or more different times, and calculate an operating temperature of the switch based on the two or more electrical signals, wherein the control unit:
      determines a first voltage across the switch equal to a first forward voltage across the parasitic diode and a first current through the switch equal to a first current through the parasitic diode at first predetermined time;
      determines a second voltage across the switch equal to a second forward voltage across the parasitic diode and a second current through the switch equal to a second current through the parasitic diode at second predetermined time; and
      calculates the switch operating temperature based on the values of the first and second forward voltages across the parasitic diode and the first and second current measurements through the parasitic diode.

16. The system of claim 15 wherein the circuit element is a MOSFET switch defined as a transistor comprising a drain to source channel and a parasitic diode positioned in parallel with the channel.

17. The system of claim 16, wherein the control unit is further configured to control each respective MOSFET switch operation and thereby control an electric motor operation based in part on calculated operating temperatures of each respective MOSFET switch.

* * * * *